3,071,573
METHOD OF PREPARING A STARCH CARBOXYL ALKYL ETHER DERIVATIVE
Kelley G. Taylor, Decatur, Ill., assignor to A. E. Staley Manufacturing Company, Decatur, Ill., a corporation of Delaware
No Drawing. Filed June 1, 1959, Ser. No. 817,036
5 Claims. (Cl. 260—233.3)

This invention relates to a method of producing a chemically modified granular starch and in particular to the production of the sodium carboxyethyl ether of starch.

In United States Patent 2,539,417, granted to V. R. Grassie, there is disclosed a reaction between alkali cellulose and an acrylic acid ester in the presence of an organic solvent. Starch is suggested as a possible equivalent for the cellulose. The statement is made that an aqueous medium does not appear to be operable because it favors the saponification of the acrylate ester before it reacts with the carbohydrate. On the contrary, I have discovered not only that starch will react with acrylic acid esters in aqueous medium, but that the presence of water is desirable. Further, despite the presence of water in the reaction according to this invention, I am able to obtain a granular product.

An object of this invention is to prepare a new granular starch derivative.

Another object is to provide a method for preparing a series of starch derivatives whose gelatinization properties may be selected over a wide range.

Another object is to provide a method of preparing carboxyalkyl derivatives of granular starch that retain their granular structure.

These and other objects will be, in part, apparent and, in part, pointed out hereinafter.

Stated generally, the method of this invention comprises reacting a granular starch with an ester of acrylic acid (or certain other acids of similar structure) in the presence of water and an alkaline catalyst to produce a granular carboxyethyl ether of starch. The reaction conditions are such that the granular structure of the starch is retained.

A carboxyethyl ether is considered to be the result of the reaction between the acrylic double bond and a starch hydroxy group with the ether linkage being formed on the terminal carbon atom of the acrylate group. In the process of this invention, the ester is hydrolyzed by the alkaline conditions prevailing in the reaction medium, and the product separated is a salt whose metal ion depends upon the alkali used as catalyst.

In many applications of starch, the change in the properties of the starch from the granular form to the pasted form is of great importance. Many processes depend upon the use of a suspension of granular starch which is caused to gelatinize at a particular time and in a particular way. For such applications, it is obviously necessary to maintain the granular form of the product.

Gelatinized starch and gelatinized starch derivatives are difficult to handle. They are not easily dried, and, when dried, are not easily reconstituted with water. Furthermore, as a dried starch paste ages, the difficulty in reconstituting the paste increases and other changes take place in the dried paste as time passes with many of the desirable properties of the starch becoming degraded. For these reasons, it is normal for starch to be sold in the granular form and, whenever a pasted or gelatinized product is desired, it is freshly prepared just prior to use. Typically, this is the case in the textile and paper industries, in industries using amylaceous adhesives, and so on.

I have found that under certain conditions depending on the alkali and reaction medium, I avoid completely the gelatinization of the starch so that the product retains its granular form. In one method, the starch is suspended in alkaline saturated aqueous sodium sulfate or sodium chloride. An alternative that I have found equally suitable is to use saturated aqueous sodium carbonate which combines the functions of furnishing the alkali catalyst and preventing the gelatinization of the starch.

The reaction in accordance with this invention may also be carried out under superficially dry conditions. As is well known, starch may appear dry in the visual and tactile sense and yet still contain 25% or more of moisture. In fact, starch that is commercially available usually contains about 10–13% moisture by weight. I have found that the moisture content should be at least as high as 10% and preferably higher in order to obtain a satisfactory product in accordance with this invention. In carrying out this reaction on superficially dry starch, the starch may be suspended in aqueous alkali, filtered and dried without washing it or it may be treated with a small amount of concentrated (e.g., 50%) aqueous alkali. Alternatively, sodium methoxide may be mixed dry with the starch and acrylate ester. In all these cases, care must be taken in adding the alkali and in neutralizing the alkali content of the product to avoid gelatinizing the starch prematurely.

In this process, any of the commercially available starches may be used although corn starch is preferred. Wheat, tapioca, potato, rice, and waxy maize starches are useful as are other modifications of starch that still retain a substantial degree of their granular amylaceous structure. Among the modified starches are the oxidized and hydrolyzed starches. These and others of the same class are comprehended in the term "granular starch" as used herein. In general, the test for the ganular character of the starch is the retention of the characteristic birefringence of the material.

The products prepared by the method of this invention may be used as binders for asbestos fiber, as binders for clay coatings on paper, for the preparation of wet-rub resistant coatings for paper and in sizing for polyester fibers, e.g., "Dacron."

The following examples illustrate this invention with all parts and percentages being by weight.

The starch referred to, unless otherwise specified, is granular native corn starch. It is to be understood that the details disclosed herein are not intended to limit the scope of the invention.

EXAMPLE 1

This example illustrates the use of alkaline saturated sodium sulfate as the suspension medium for the starch. Saturated aqueous sodium sulfate was prepared by adding the salt to tap water at 100° F. With stirring, 486 grams starch (dry substance) was added to 805 cubic centimeters of the hot saturated solution of sodium sulfate. With rapid stirring, 15 grams of sodium hydroxide in approximately 40 cubic centimeters of water was slowly added. Immediately thereafter, 42.5 grams of ethyl acrylate was added. The reaction mixture was stirred continuously for 18 hours at 100° F. At the end of this time the slurry was neutralized with hydrochloric acid and filtered. The product was washed by re-suspending it in water and filtering through two cycles. The granular product gelatinized at a low temperature to a clear, transparent and very viscous paste. This product assayed 3.5% sodium carboxyethyl.

EXAMPLE 2

This example illustrates the use of saturated sodium carbonate as alkali and reaction medium. To 805 milliliters of water saturated with sodium carbonate at 130° F. (about 356 grams of sodium carbonate), there was added 486 grams of starch dry substance. After mixing thoroughly, the slurry was placed in a 2-liter, 3-necked, round-bottom flask equipped with a mechanical stirrer, a reflux condenser, and a dropping funnel. Ethyl acrylate (42.5 grams) was added and the reaction mixture was stirred at 130° F. for 18 hours. The product was readily pasted in water to a clear, viscous, long-flowing paste. In a number of trials with this method the average sodium carboxyethyl content was 4.2%.

Using the procedure of Example 1, with a number of esters of acrylic acid, it was found that starch products of widely varying paste properties could be made. These are illustrated in Table 1.

Table 1

| Ester Used | Results | |
|---|---|---|
| | Paste Characteristics | Content of Sodium Carboxyethyl, percent |
| methyl acrylate | Too inhibited to cook | 4.0 |
| butyl acrylate | Viscous, stringy | 2.3–2.6 |
| methoxyethyl acrylate | Too inhibited to cook | 2.1 |
| dimethylaminoethyl acrylate | Very viscous, short | 1.5 |
| diethylaminoethyl acrylate | Viscous, short | 1.9 |
| benzyl acrylate | Very viscous, short | 3.4 |
| 2-ethylbutyl acrylate | Similar to native starch | 0.9 |
| 2-ethylhexyl acrylate | ——do—— | 0.9 |
| decyl acrylate | ——do—— | 1.2 |
| tri-decyl acrylate | ——do—— | 1.1 |
| 2-bromoethyl acrylate | Too inhibited to cook | 3.3 |
| allyl acrylate | ——do—— | 3.2 |

All of the products produced by the method of this invention produce very viscous pastes in water (substantially greater than the viscosity of the common thick-boiling starches) or they are inhibited to pasting. These properties are often produced in reacting starch and certain bi-functional reagents in such a manner that each functional group of the reagent is capable of reacting with a different starch molecule. Thereby two starch molecules are linked through the reagent. A granular product produced from such a reaction may form a very viscous paste or it may be difficult or impossible to gelatinize it in the ordinary way. This, I believe, occurred in the products prepared in accordance with this invention. Since these products have a carboxyl group that is available for reaction, it is probable that the large increase in viscosity obtained when pasting these products and the inhibition to pasting of some of the products are the result of the esterification of the carboxyl groups with another starch molecule which furnishes the hydroxyl group.

EXAMPLE 3

This example illustrates the effect of time on the reaction in accordance with this invention. The procedure of Example 1 was followed except that 23 grams of sodium hydroxide were used and the time was varied. The results are displayed in Table 2.

Table 2

| Time (hours) | Assay, Percent Sodium Carboxyethyl | Paste Characteristics |
|---|---|---|
| 1 | 1.2 | Short and viscous; requires extended cooking time at 195° F. |
| 2 | 2.5 | Pasting temperature 140° F.; long and viscous. |
| 3 | | Pasting temperature 134° F; long and viscous. |
| 4 | 3.6 | Pasting temperature 134° F.; short and viscous. |

EXAMPLE 4

This example illustrates the use of saturated aqueous sodium chloride as the medium to prevent the gelatinization of the starch. The procedure used was essentially that of Example 1 except that the reaction medium was saturated with sodium chloride. The results obtained were similar to those obtained with sodium sulfate.

EXAMPLE 5

This example illustrates the use of potassium hydroxide as the alkaline catalyst in carrying out this reaction. The proportions used were essentially the same as of Example 1 except that 32 grams of potassium hydroxide were added dissolved in a few milliliters of water. The reaction was carried out for 2 hours at 100° F. The granular product was neutralized with hydrochloric acid, filtered and washed three times by suspending it in water and refiltering. The assay of the product was 2.5% sodium carboxyethyl. The product was cooked in water and it was found to be pasted at 140° F. and the paste was short and viscous.

EXAMPLE 6

This example illustrates two aspects of the invention: the use of barium hydroxide as the alkaline catalyst and the avoidance of a saturated-salt reaction medium. To 805 mls. of water, 486 grams of native corn starch (dry weight basis) was added with stirring to suspend the starch. Then 42.5 grams of ethyl acrylate were added followed by 32 grams of barium hydroxide. The reaction mixture was stirred for 18 hours while at a temperature of 100° F. The product was granular and assayed 1.4% sodium carboxyethyl. The product formed a paste at 156° F. and the paste was non-congealing. This is an important advantage in many applications because it is necessary to cool a starch paste and then reheat it. Starch pastes that congeal must be kept hot because the congealing is, generally speaking, irreversible. Once congealed, a starch paste is generally useless and must be discarded. It is difficult even to clean the equipment containing it for it does not flow.

While all of the foregoing examples have been directed to esters of acrylic acid, I have found that certain other esters of similar structure will also react in the same manner to produce a carboxyalkyl ether of starch. These are illustrated hereafter, and they include the methyl and ethyl esters of crotonic and itaconic acids. Surprisingly, I have been unable to perform this reaction with esters of methacrylic acid. Neither methyl nor ethyl methacrylate appeared to react with starch under the conditions used for the corresponding acrylate esters. There was some evidence of a reaction with the methyl ester, but the evidence for reaction was equivocal.

EXAMPLE 7

Using the conditions of Example 1 in all essential details, ethyl crotonate was reacted with starch to produce a granular carboxypropyl ether of starch which assayed 1.29% sodium carboxypropyl. The paste produced from this product was non-congealing, that is, on cooling the paste remains fluid rather than forming a more or less rigid gel as is normal within native-starch pastes.

In analogy to the acrylic esters, the structure of this product appears to be the following in which the X represents the anhydroglucose ring of starch:

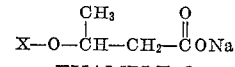

EXAMPLE 8

Using the conditions of Example 1 in all essential details, dimethyl itaconate was reacted with starch to produce the corresponding sodium dicarboxy ether. The assay was approximately 1.3% and the product appeared to be partially inhibited to pasting, but, after a long period of heating, a thin paste was produced. There was no reaction when dibutyl itaconate was substituted for the dimethyl ester. The structure of this product appears to be the following in which X represents the anhydroglucose ring of starch:

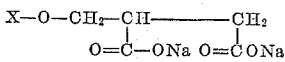

As described before, the reaction in accordance with this invention may be carried out with certain modified starches, such as the acid-converted or the hypochlorite oxidized starch. I have found that it is possible to oxidize the starch with sodium hypochlorite and without separating the oxidized product react it with an acrylic ester to produce the sodium carboxyethyl ether. In this case, the starch was treated with sodium hypochlorite in saturated aqueous sodium carbonate to oxidize the starch. After the sodium hypochlorite had been consumed, then the ethyl acrylate was added and the reaction carried out as described before.

Since many embodiments may be made of this invention and since many changes may be made in the embodiments described, the foregoing is to be interpreted as illustrative only and the invention is to be defined by the claims appended hereafter.

I claim:

1. The method of preparing a starch carboxy alkyl ether that comprises reacting hydroxyl groups of superficially dry ungelatinized starch with an ethylenically unsaturated ester selected from the group consisting of methyl and ethyl esters of crotonic and itaconic acids and the esters of acrylic acid in the presence of at least 10% water as the only solvent present and in the presence of an alkaline catalyst at a temperature below the gelatinization temperature of the starch carboxy alkyl ether in the presence of said catalyst, the concentration of alkaline catalyst being a minor amount insufficient to swell the carboxy alkyl ether, neutralizing the reaction mixture, washing the product with water below the gelatinization temperature of the carboxy alkyl starch ether, whereby gelatinization of said ether is prevented, and recovering the resultant ether.

2. The method of preparing a starch carboxy alkyl ether that comprises reacting hydroxyl groups of ungelatinized starch in aqueous suspension with an ethylenically unsaturated ester selected from the group consisting of methyl and ethyl esters of crotonic and itaconic acid and esters of acrylic acid in the presence of an alkaline catalyst at a temperature below the gelatinization temperature of the starch carboxy alkyl ether in the presence of said catalyst, the concentration of alkaline catalyst being a minor amount insufficient to swell the carboxy alkyl ether, neutralizing the reaction mixture, washing the product with water below the gelatinization temperature of the carboxy alkyl starch ether, whereby gelatinization of said ether is prevented, and recovering the resultant ether.

3. The method of claim 2 in which said aqueous suspension contains an inorganic gelatinization retarding agent selected from the group consisting of sodium sulfate, sodium chloride and sodium carbonate.

4. The method of claim 3 in which the ethylenically unsaturated ester is an ester of acrylic acid.

5. The method of claim 4 in which said aqueous suspension is saturated with sodium carbonate as the sole alkaline catalyst and gelatinization-retarding agent.

References Cited in the file of this patent

UNITED STATES PATENTS

| | | |
|---|---|---|
| 2,500,950 | Konisberg | Mar. 21, 1950 |
| 2,539,417 | Grassie | Jan. 30, 1951 |
| 2,668,156 | Caldwell et al. | Feb. 2, 1954 |